Sept. 4, 1934.   M. E. WIATT   1,972,671
HILLSIDE CULTIVATOR
Filed Oct. 25, 1933

Inventor
Marcus E. Wiatt
By Clarence A. O'Brien
Attorney

Patented Sept. 4, 1934

1,972,671

UNITED STATES PATENT OFFICE 1,972,671

HILLSIDE CULTIVATOR

Marcus Elmer Wiatt, Council Bluffs, Iowa

Application October 25, 1933, Serial No. 695,179

1 Claim. (Cl. 97—169)

My invention relates generally to weeders and cultivators, and particularly to a combined weeder and cultivator which very considerably reduces the trouble of weeding and cultivating bushes, vines and the like growing in hilly and uneven ground, and an important object of my invention is to provide an improved device of this character involving simplicity of structure which provides adequate weight and maneuverability and inexpensive manufacture.

It is also an important object of my invention to provide a device of the character described above which is readily adjustable so that the same can be used throughout the cultivation period as the plants attain larger growth and spread, the device having adequate ground resistance and balance, and severing the weeds at their roots while leaving the ground loose mulched, so that the ground will not be subject to being baked or washed away.

Other objects and advantages of my invention will be apparent from a reading of the following description in connection with the drawing, wherein for purposes of illustration I have shown a preferred embodiment of my invention.

In the drawing:—

Figure 1:
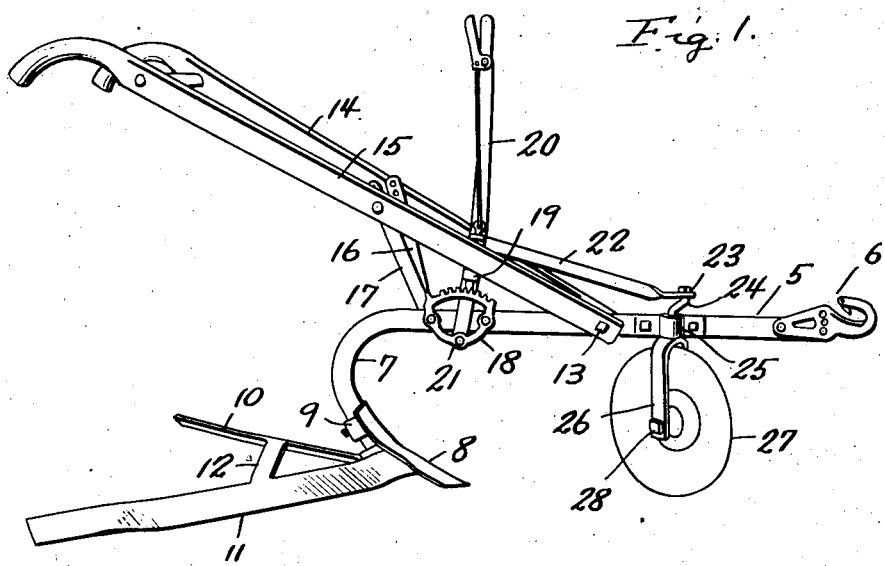
Figure 1 is a general perspective view of the device.

Referring in detail to the drawing, the numeral 5 refers generally to a standard type of cultivator beam at the forward end of which is adjustably connected a clevis hook 6, and upon the lower end of the crook 7 is a standard type of bull-tongue 8 mounted by the usual clamp means 9.

Figure 2:
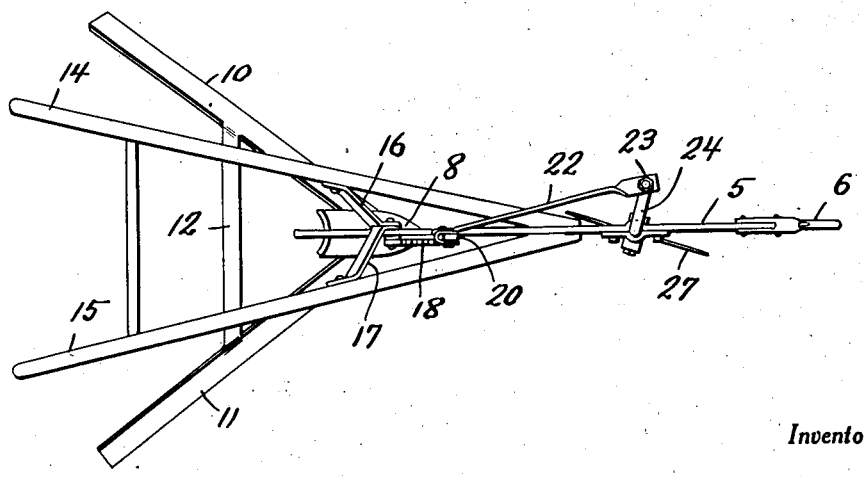
Figure 2 is a top plan view of Figure 1.

To the back of the bull-tongue 8 is mounted a pair of forwardly and downwardly slanting blades 10, 11, which are connected by a brace 12 so that they maintain their normal position. The spread of the blades 10, 11 is clearly shown in Figure 2.

Attached as indicated at 13 to an intermediate portion of the beam 5 are the forward and depressed ends of handles 14, 15 of conventional cultivator type which are adjustably connected to a rearward portion of the beam by links 16, 17. Just forward of the point of attachment of the links 16, 17 is a sector 18 for cooperation with the releasable detent 19 of a hand lever 20 which is pivoted on the sector as indicated at 21. Reaching forwardly from the hand lever 20 is a link 22 whose forward end is pivotally connected as indicated at 23 to a crank 24 on the upper end of a stub-shaft journaled in a bearing 25 attached to the beam as shown. The bull-tongue, the beam, and the stub shaft are thereby arranged in the same vertical plane.

Connected to the lower end of the crank 24 is a fork 26 between which is mounted a guide wheel 27 of the disk type which is mounted on the pivot 28. It is believed to be obvious that manipulating the hand lever 20 will cause the guide wheel 27 to be rotated to the left or to the right, that is, assume a straight ahead position or an angularly transverse position such as that indicated in the drawing. By turning the guide wheel 27 out of a vertical plane common to the bull-tongue and the beam, the course of the cultivator may be maintained in a predetermined direction so that the application of either of the blades 10, 11 to the weeds is made accurate, and the progress of the cultivator facilitated despite irregularities of the ground surface. The form of the invention shown is particularly adapted for one-horse draft. Sets of blades 10, 11 of different lengths and spreads is to be furnished with each cultivator so that as the plants grow larger and the amount of reach required to reach the weeds thereunder increases, a set of larger blades may be used.

Although I have shown and described herein a preferred embodiment of my invention, it is to be definitely understood that I do not desire to limit the application of the invention thereto, and any change or changes may be made in material and structure and arrangement of parts, within the spirit of the invention and the scope of the subjoined claim.

What is claimed is:—

A dirigible hillside cultivator of the type described, said cultivator comprising a generally horizontal beam having a draft connection at its front end, the rear end of the beam being downwardly curved, a rearwardly and laterally extending bull tongue secured to the downwardly curved rear end of the beam, a colter disk mounted on a rotatable vertical shaft, said shaft being connected to said beam near the front end thereof and having an operating crank, a pair of cultivator handles having their depressed front ends fastened to said beam at a point rearwardly of and adjacent said vertical shaft, a toothed sector mounted on said beam at a second point intermediate the first point and the rear end of the beam, a lever pivoted at its lower end to said sector and having a releasable dog normally engaging the teeth of said sector to hold the lever in adjusted position, said lever rising between said cultivator handles in a position to be conveniently manipulated by the operator of the cultivator while the cultivator is in forward motion for steering the cultivator, and a link operatively connecting an upper part of said lever and said operating crank.

MARCUS ELMER WIATT.